United States Patent [19]

Frishling

[11] Patent Number: 4,958,416
[45] Date of Patent: Sep. 25, 1990

[54] SHOULDER HARNESS STRAP ADJUSTER AND COMFORT CLIP

[76] Inventor: Dan Frishling, 355 Donlin La., Newbury Park, Calif. 91320

[21] Appl. No.: 374,085

[22] Filed: Jun. 29, 1989

[51] Int. Cl.$^5$ .............................................. A44B 11/25
[52] U.S. Cl. ........................................ 24/170; 24/312
[58] Field of Search ................ 24/312, 311, 170, 191, 24/302, 301; 297/483, 468

[56] References Cited

U.S. PATENT DOCUMENTS

| | | | |
|---|---|---|---|
| 318,053 | 5/1885 | Thurlow | 24/170 |
| 330,213 | 11/1885 | Deweese | 24/170 |
| 3,265,439 | 8/1966 | McEwen | 24/311 |
| 3,480,325 | 11/1969 | Kramer | 24/170 |
| 4,334,701 | 6/1982 | Takada | 297/483 |
| 4,420,858 | 12/1983 | Noda | 24/170 |
| 4,733,440 | 3/1988 | Ogawa | 24/170 |
| 4,832,367 | 5/1989 | Lisenby | 297/483 |

FOREIGN PATENT DOCUMENTS

| | | | |
|---|---|---|---|
| 489040 | 11/1976 | Australia | 297/468 |
| 0685348 | 2/1967 | Belgium | 24/302 |
| 3132735 | 3/1983 | Fed. Rep. of Germany | 297/483 |
| 0053268 | 3/1987 | Japan | 297/483 |

*Primary Examiner*—Victor N. Sakran
*Attorney, Agent, or Firm*—Allan M. Shapiro

[57] ABSTRACT

The comfort clip is comprised of a base with two arms integrally formed therewith and a latch movably mounted thereon to clamp the shoulder harness strap or lap belt strap at a selected position thereon.

When two of such comfort clips are used, one on the shoulder harness strap and one on the lap belt strap a rod is connected therebetween to pull the shoulder harness strap sufficiently down so that it is comfortable on the shoulder of a diminutive user. The ends of the rod are held in place on the comfort clips by the straps and are locked in place by the latch.

7 Claims, 3 Drawing Sheets

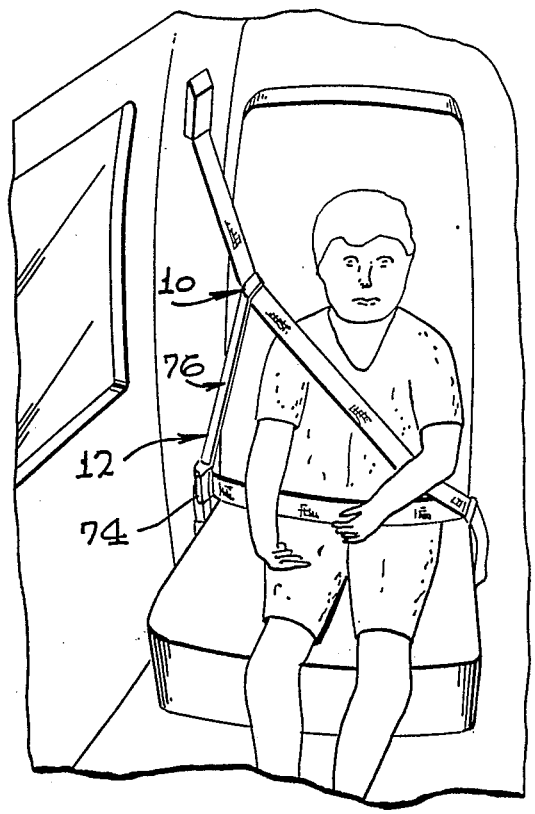
FIG. 1
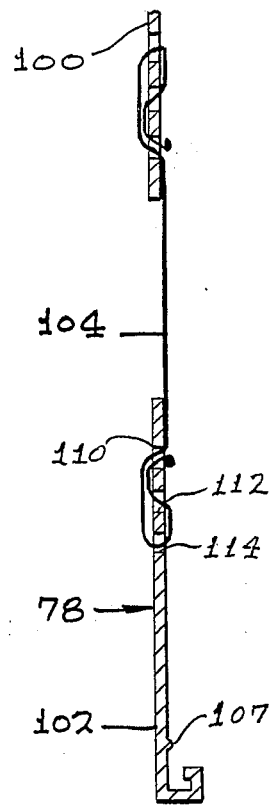
FIG. 8
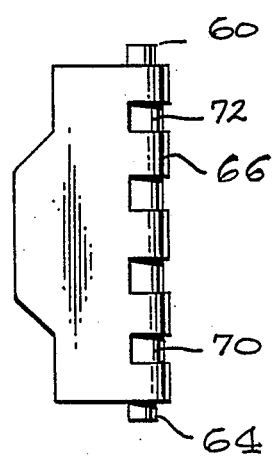
FIG. 4
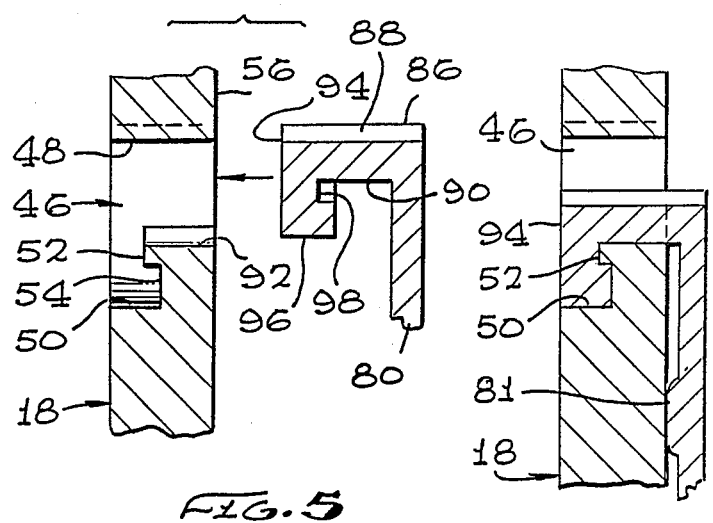
FIG. 5
FIG. 6
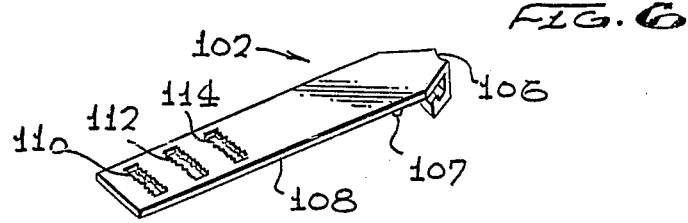
FIG. 7

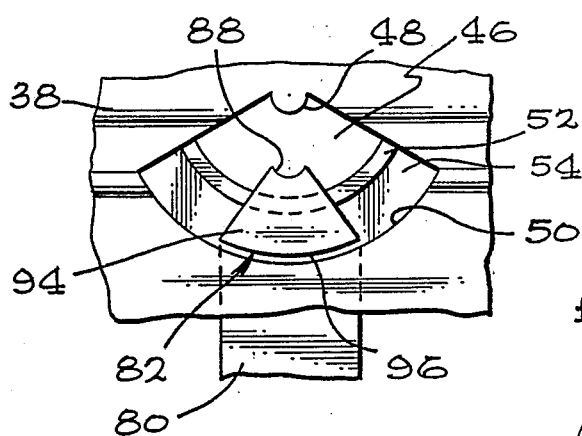
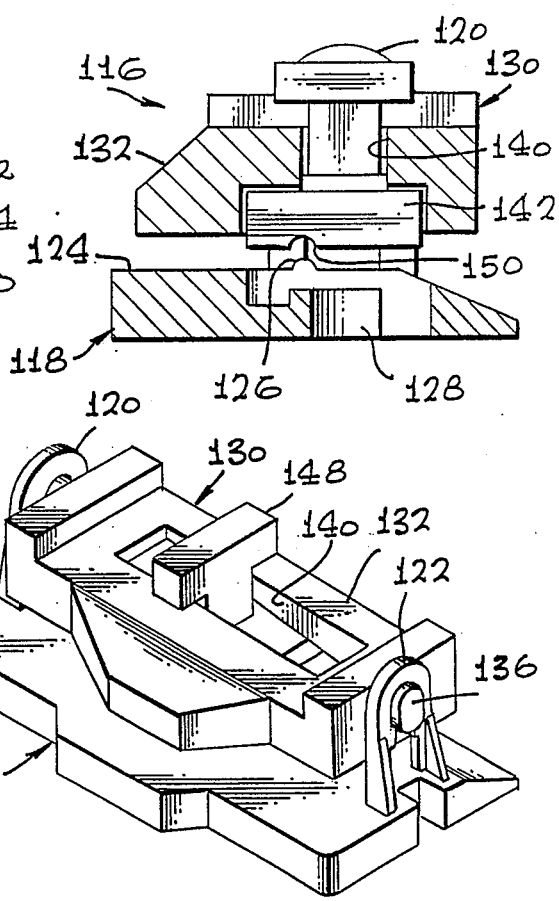
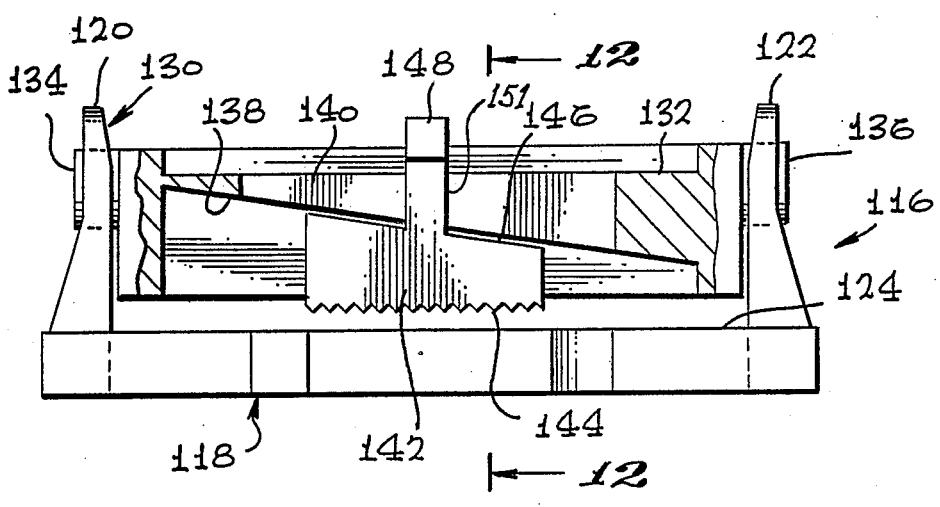

4,958,416

SHOULDER HARNESS STRAP ADJUSTER AND COMFORT CLIP

FIELD OF THE INVENTION

This invention is directed to a shoulder harness strap adjuster particularly useful in placing the shoulder harness strap of an automobile seat belt in the proper location across a child's shoulder.

BACKGROUND OF THE INVENTION

Modern automobile seat belts include a lap belt strap which is engaged low upon the waist and a shoulder harness strap, usefully part of the same strap, which engages diagonally across the chest and off the shoulder to be anchored high on the side wall of the vehicle. In some shoulder harness strap installations, the strap is constantly spring-tensioned so as to engage across the person's chest with a constant presence. This is objectionable to many users, to the extent that the shoulder harness strap portion of the seat belt assembly is not used. When the shoulder harness strap is not used, often the lap belt strap also is not used. In order to make the shoulder harness strap of the seat belt assembly more satisfactory so that its use is more assured, a stop is necessary to prevent the constant spring force of the shoulder harness strap upon the shoulder. Such stops are known and engage upon the shoulder harness strap where it passes through a guide or enters the vehicle wall. These shoulder harness strap stops are called "comfort clips." Prior comfort clips have not been easy to use and of reliable construction. Thus, there is need for an improved comfort clip.

Another problem is presented by the shoulder harness strap of the seat belt. The shorter stature of children causes the shoulder harness strap to extend across a child's face or under his chin, uncomfortably engaging his neck. As a consequence, in such cases, the shoulder harness strap is often placed behind the child where it is ineffective. The second problem is addressed by this invention by providing two of the comfort clips, one engaging on the seat belt strap and the other engaging on the shoulder harness strap, together with a rod interconnecting the two comfort clips to draw the shoulder harness strap down to a position across the child's shoulder, where it is effective.

SUMMARY OF THE INVENTION

In order to aid in the understanding of this invention, it can be stated in essentially summary form that it is directed to a comfort clip for use with automobile seat belts. The comfort clip has a base with two upstanding arms. A latch snaps into guides in the arms so that the shoulder harness strap can be first inserted therein. The latch is movable from a disengaged position to a position where it clamps the strap. The comfort clip is adjustable along the length of the strap when it is in the disengaged position and is locked in place when in the engaged position.

A shoulder harness strap adjuster is achieved when two of such comfort clips are provided for engagement on the lap belt strap and shoulder harness strap, together with a rod therebetween to pull the shoulder harness strap down into a comfortable position.

It is thus an object and advantage of this invention to provide a comfort clip for disengageable clamping on a shoulder harness strap to provide a stop which controls the shoulder harness strap tension.

It is another object and advantage of this invention to provide a comfort clip which is easy and inexpensive to manufacture and is easy and reliable to use so that it can be conveniently utilized by a large section of the motoring public to improve the comfort of their use of the automobile seat belt.

It is another object and advantage of this invention to provide a shoulder harness strap adjuster which includes a comfort clip on the shoulder harness strap of the seat belt to pull down the shoulder harness strap to a proper position for children of insufficient stature to be properly protected by the conventional seat belt geometry.

It is another object and advantage of this invention to provide a shoulder harness strap adjuster which includes means for adjusting the distance between the two comfort clips to permit adjustment of the height of the shoulder harness strap. This permits utilization of the shoulder harness strap adjuster for different automotive belt configurations and persons of different stature.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a perspective view of the interior of an automobile, with parts broken away, showing a child in the passenger seat of the automotive vehicle with the child being secured by a seat belt employing the shoulder harness strap adjuster of this invention, together with two of the comfort clips of this invention in their first preferred embodiment.

FIG. 4 is an enlarged bottom view of the rotary latch of the comfort clip, as seen generally along the line 4—4 of FIG. 2.

FIG. 5 is a longitudinal section through one of the comfort clips and adjusting rod of this engagement, showing the manner in which they are engaged, with parts broken away.

FIG. 6 is similar to FIG. 5, showing the adjustment rod engaged on the comfort clip, with parts broken away.

FIG. 7 is a perspective view of a second embodiment of the adjustment rod for the shoulder harness strap of this invention.

FIG. 8 is a longitudinal section through the second preferred embodiment of the adjustment rod, with parts broken away.

FIG. 9 is a plan view of the base of the first preferred embodiment of the comfort clip showing the engagement of the rod therewith.

FIG. 10 an isometric view of the second preferred embodiment of the comfort clip of this invention.

FIG. 11 is an enlarged vertical section through the second preferred embodiment of the comfort clip, partially broken away.

FIG. 12 is a transverse section through the comfort clip of FIG. 10, as seen generally along line 12—12 of FIG. 11.

DESCRIPTION OF THE PREFERRED EMBODIMENTS

Figure 2:
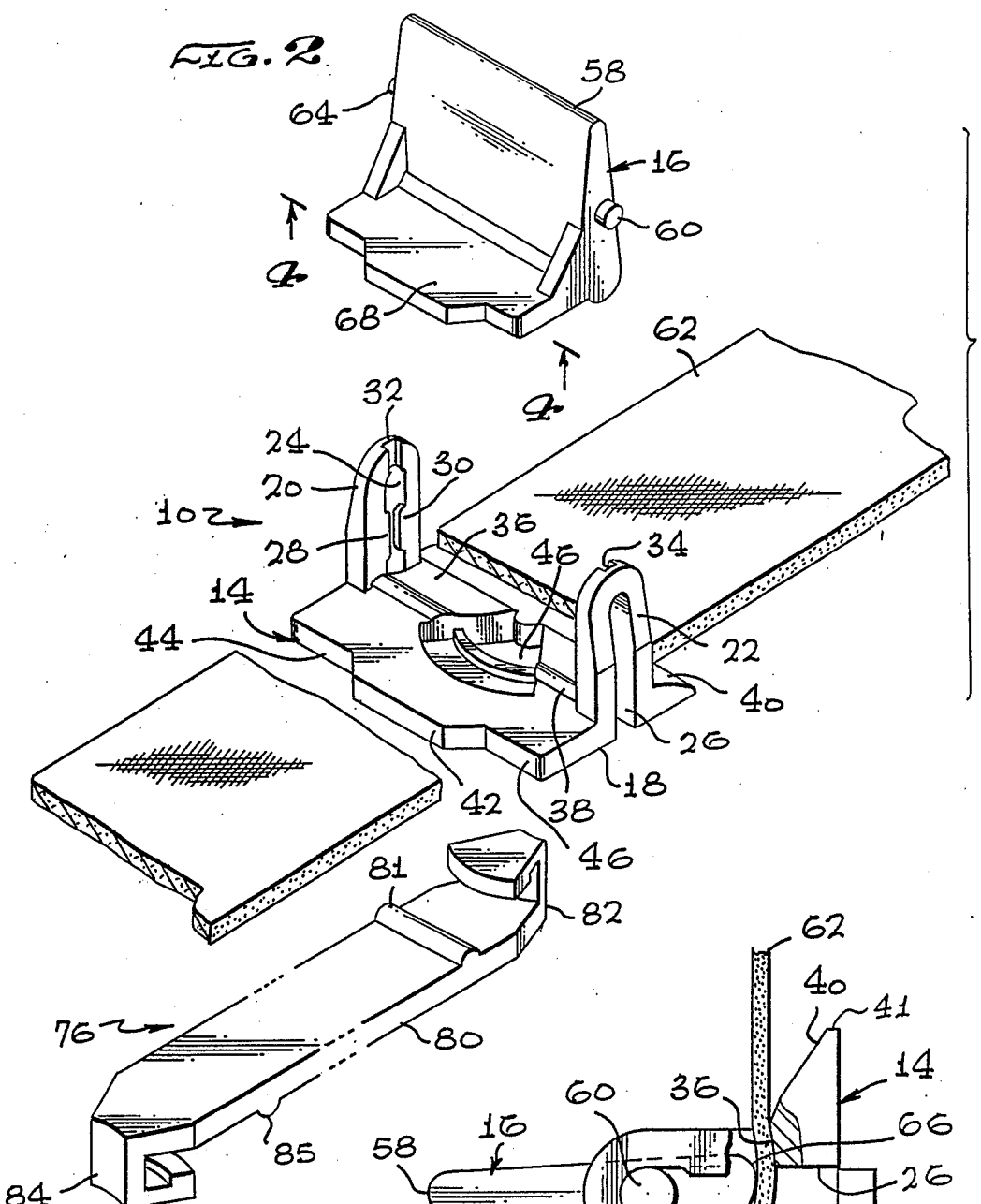
FIG. 2 is an exploded view of the shoulder harness strap adjuster and first preferred embodiment of the comfort clip of this invention, with parts broken away.
Figure 3:
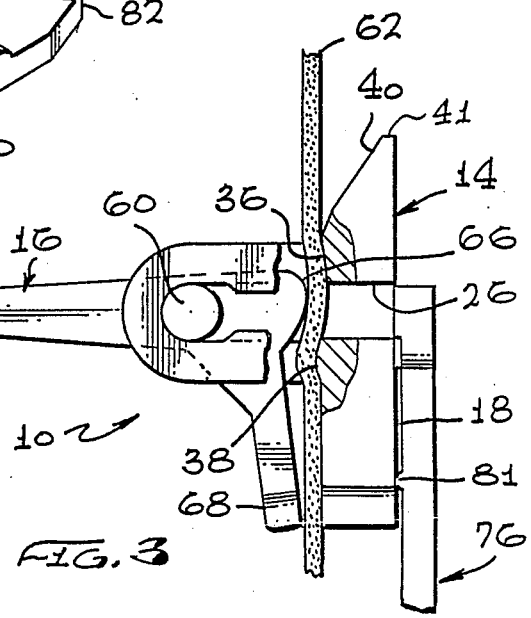
FIG. 3 is a side-elevational view of the comfort clip of FIG. 2 clamped on a seat belt strap, with parts broken away to show the clamping engagement of the latch on the belt.

The comfort clip of this invention is generally indicated at 10 in FIGS. 2 and 3, and its assembly into a shoulder harness strap adjuster is generally indicated at 12 in FIG. 1. The comfort clip is comprised of a base 14 with which rotary latch 16 interacts to clamp a strap of an automotive seat belt therebetween. Base 14 comprises a relatively flat base plate 18 from which upwardly extend arms 20 and 22. The arms respectively have slots 24 and 26 extending upwardly from the bottom of the base to terminate in an arcuate bearing within the top of the arm. The slots are provided with restricting flanges toward the facing inter-surfaces thereof. Restricting flanges 28 and 30 are shown in FIG. 2 with respect to arm 20. The restriction flanges are sufficiently resilient that the pivot pins 60 and 64 of the rotary latch 16 will not move downwardly past the restricting flanges. Guide grooves 32 and 34 are respectively formed into the facing sides of the arms 20 and 22 above the slots 24 and 26 to guide the pivot pins of the rotary latch 16 into the slots, by resilient deflection of the arms. The structure shown in FIG. 2 is a convenient structure for the molding and assembly of the base and rotary latch. A second preferred embodiment is to provide pivot pin openings in the arms 20 and 22 so that the pivot pins 60 and 64 can be received directly therein. In this way, slotting is not necessary, but the rotary latch will rotate freely in its pivot pin openings in the arms.

Shallow rounded groove 36 is formed in the top of the base between the arms. The curvature of the groove is generally a cylindrical curvature around the pivot center and the tops of the arms. On the non-tension side of groove 36, ridge 38 is formed. On the tension side of the groove, the top of the base is provided with rounded surface 40 to prevent a sharp bend in the strap engaged in the comfort clip, and slopes to a narrow end edge 41 so as to stop itself upon the shoulder strap guide (not shown) which exists in many cars, usually attached to the car's front seat back. On the opposite edge of the base from the curved surface 40, the base terminates in edge 42. On each side of the edge, there is a recessed surface, shown at 44 and 46 in FIG. 2, which are toward the groove 36 from the edge surface 42. The reason for this configuration will become more apparent as the rotary latch 16 is described hereinbelow.

Connector recess 46 is formed in the base 18 between arms 20 and 22. The connector recess is shown in the isometric view of FIG. 2 wherein it is apparent that it is arcuate around a vertical axis. It is shown in more detail in FIG. 5, which is the centerline section through the recess. The connector recess is also seen in FIG. 6 with the hereinbelow-described adjustment rod shown engaged therein. Connector recess 46 is defined by arcuate surfaces 48 and 50. Between these arcuate surfaces is formed arcuate ridge 52. Below ridge 52, the recess goes about halfway through the base 18 to terminate in floor 54. Above the arcuate ridge 52, the recess extends all the way through base 18, through to bottom surface 56.

Rotary latch 16 is a latching member which has an operating handle 58 of substantially uniform cross section and of length to fit between the arms 20 and 22. It carries a pivot pin on each end thereof, in line with each other with the near pivot pin 60 shown in FIGS. 2 and 3. Axially aligned with it on the far end of the operating handle is a second pivot pin 64, shown in FIG. 4. These pivot pins are sized so that they are freely rotatable in the tops of slots 24 and 26. When the belt strap 62 is laid between the arms 20 and 22, as seen in FIG. 2, the rotary latch 16 is snapped into the base by inserting the pivot pins into the guide grooves 32 and 34 and pressing down upon the rotary latch. There is sufficient resiliency in the arms that they spring back to permit the pivot pins to enter into the upper parts of the slots 24 and 26. The tops of the slots are arcuate to receive the pivot pins in freely rotating condition. The lower end of operating handle 58, below the pivot pins, is formed into a rounded engagement surface 66, which is shaped to clamp the belt strap 62 between the engagement surface 66 and the groove 36. To prevent over-rotation of the rotary latch 16, stop arm 68 is formed on the rotary latch. The stop arm 68 is configured with the same outline as the surfaces 42, 44 and 46 and lies substantially in line with them when the latch is in the engaged position seen in FIG. 3. In order to increase the local clamping friction, the engagement surface 66 is provided with recesses, as seen in FIG. 4. A series of recesses is formed on the engagement surface, with recesses 70 and 72 specifically identified. These recesses allow for variations in belt strap thickness as well as permit easier rotation of the rotary latch to the locked and the open positions without reducing the positive locking of the belt strap in the comfort clip.

It is clear from this structure that the base may be engaged upon a belt strap and, thereupon, the rotary latch snapped in place to capture the strap. This creates the complete comfort clip 10. When the comfort clip 10 is positioned at the requisite location along the belt strap, the operating handle 58 is raised to the latched position, and the stop arm 68 is pressed toward surface 42, as shown in FIG. 3 and the comfort clip stays in place. The belt tension should be in the upward direction in FIG. 3 and in the upper right direction in FIG. 2.

While a rotary latch may be employed to clamp the strap within the comfort clip, a linearly operating latch may alternatively be employed. The comfort clip 116, seen in FIGS. 10, 11 and 12, is functionally the same and structurally similar to the comfort clip 10. Base 118 has a similar outline configuration to base 14 and has upstanding arms 120 and 122. The arms stand above the top surface 124 of the base. The top surface has a ridge 126 thereon similar to ridge 38. Connector recess 128 extends through the base and is identical to the connector recess 46. The distance between the upstanding arms 120 and 122 is sufficient to receive a strap therebetween for clamping the strap against the top surface of the base. Latching member 130 is a two-part structure for latching the strap in place. Latch body 132 has ears 134 and 136 as its ends which fit into the slots in the upstanding arms 120 and 122. These slots are the same as the previously described slots. The resiliency of the arms 120 and 122 permit the engagement of the latch body between the upstanding arms with the ears in the slots. The lower surface of the latch body includes an inclined ramp 138 which extends almost all the way across latch body 132, as seen in FIG. 11. Handle slot is open from the ramp surface up through the latch body. Positioned under the inclined ramp surface is sliding latch 142. Sliding latch 142 has a roughened latching surface 144 which faces the top surface 124. The upper surface of the sliding latch is an inclined surface 146 which corresponds to and engages with the inclined ramp 138. Latch handle 148 extends upwardly through the handle slot 140. As is seen in FIG. 12, sliding latch 142 is engaged between flanges in the latch body to prevent its rotation. In addition, the sliding latch 142 has a groove 150 in the bottom which corresponds to the ridge 126 to clamp a strap between. It is seen that, as the handle 148 is moved to the right as the comfort clip 116 is seen in FIGS. 10 and 11, the latching surface approaches the top surface 124 of the base to clamp a strap therebetween. The comfort clip 116, thus, is able to clamp straps therein and to securely clamp straps of a wider thickness tolerance than the comfort clip 10. The neck 151 of sliding latch 142 is sufficiently long to allow the entrance and exit of the sliding latch 142 into the latch body 132.

A pair of the comfort clips of either embodiment may be used together with a adjustment rod in order to form a shoulder strap harness adjuster, as seen in FIG. 1. Comfort clip 10 is shown therein, and an identical comfort clip 74 is used in association therewith. While the following description describes two of the comfort clips 10 used together in order to form a shoulder harness adjuster, it is clear that two of the comfort clips 116 could be used together to form a similar shoulder harness adjuster. The connector recess 128 is identical to the connector recess 46 and, thus, any combination of comfort clips and adjusting rods is feasible. Connected between the comfort clips is an adjusting rod. Two embodiments of a suitable rod are disclosed herein. The first preferred embodiment of the adjuster rod is indicated at 76 in FIG. 2, and the second preferred embodiment thereof is indicated at 78 in FIG. 8. Adjuster rod 76 has a rod body 80 of substantially rectangular and uniform cross section and has connector bodies 82 and 84 thereon at opposite ends thereof. Connector body 82 is shown in more detail in FIGS. 5, 6 and 9 and connector body 84 is identical, but on the other side of the other end of the rod. Each of the connector bodies is formed with an arcuate flange 86 extending from the side thereof. The arcuate angle is less than the arcuate angle of recess 46, perhaps half the angle. The outside surface 88 of the flange is of the curvature of surface 48. The inside surface 90 is the same curvature as the lower surface 92 of that portion of the connector recess 46 which extends through the base. Thus, the surfaces 88 and 90 are curved the same as the surfaces with which they engage.

On the end of arcuate flange 86 is hook 94, which has an arcuate surface 96 which is of the same curvature as surface 50. The distance between surfaces 88 and 96 is such that the hook will fit through the slot of recess 46. The back of the hook has an arcuate slot 98 to receive arcuate ridge 52. This permits the connector body 82 to be inserted through from the back of base 18 through the opening 46 therethrough and into the recess in the front thereof. It permits the hook to engage into the connector recess 46, as shown in FIG. 6. Limited angular rotation between the rod and the comfort clip is permitted, as seen in FIG. 9, because the connector body is of lesser angular length than the connector recess in which it is received. The limited angular rotation is required to facilitate correct alignment of the comfort clip with relation to the lap belt strap attachment to the car, shoulder harness adjustment to the car, seat location in the car, as well as the size of the passenger. As is seen in FIG. 1, a comfort clip is attached to each end of the rod, and the comfort clips are respectively attached to the lap belt strap and the shoulder harness strap of the seat belt. The length of the rod is such as to draw the shoulder harness strap of the seat belt down to a point where the shoulder harness strap extends over the shoulder of the wearer of diminutive stature, as shown in FIG. 1. Once the comfort clips are in the proper location on the straps and the adjustment rods have been inserted and engaged in the comfort clips and rotated to present the optimum angular position for the passenger, the comfort clips are locked under the straps by engaging the latches. In the case of the comfort clip 10, this is accomplished by swinging the stop arm 68 toward the surface 42 to thus hold the strap in place. In the case of comfort clip 116, engagement is accomplished by grasping handle 148 and sliding latch 142 to clamp the strap between the latching surface 144 and the top surface 124. Thus, the shoulder harness strap is pulled down so that a child may comfortably wear both the lap belt strap and the shoulder harness strap to give him full protection.

The hooks on the connector bodies on the adjuster rod firmly engage in their corresponding recesses in the base of the comfort clip. The engagement of the hook in the corresponding hook recess with the flange 52 in flange recess 98, provides considerable security. However, when the strap is engaged below the latching surface, the strap directly engages on the top 94 of the hook to hold the hook in place. When the latch is engaged on a strap, the hook on the adjuster rod cannot be dislodged from its engagement in the comfort clip. In addition, the rod body 80 is provided with ridge 81 adjacent hook 82 and ridge 85 adjacent hook 84, see FIG. 2. Ridge 81 is also seen in FIGS. 3 and 6. This ridge pulls the body away from the bottom of the comfort clip (except at the ridge) to permit resilient deflection of the hook into its recess to thus provide secure connection.

The adjuster rod 78 is the same as the adjuster rod 76, except that it is adjustable in length. Adjuster rod 78 comprises end pieces 100 and 102 together with strap 104. The end pieces 100 and 102 are the same, and the one end piece 102 is shown in FIG. 7. It comprises a connector body 106, which is identical with the connector bodies 82 and 84, together with a rod body 108. Ridge 107 lies adjacent connector body 106 to permit resilient insertion of the connector body into its corresponding recess. Instead of being long and joining two connector bodies, as does the adjuster rod 76, as seen in FIG. 2, the rod body is discontinuous and has three strap slots therein. The strap slots are indicated at 110, 112 and 114 in FIGS. 7 and 8. The end piece 100 is identical. Strap 104 engages through the strap slots in each of the end pieces to define the distance between the connector bodies of adjuster rod 78. The connector bodies are engaged in comfort clips, in the same manner as previously described, to limit the distance between the two connector bodies. The advantage of adjuster rod 78 is that the molded pieces can be of smaller size and that the distance between the connector bodies thereon can be adjusted. All parts are molded of a tough, structural injection-moldable synthetic polymer composition material such as nylon so that the entire structure can be accurately and economically made.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A shoulder harness strap and adjuster comprising:
   a first comfort clip for attachment to the shoulder harness strap of an automotive seat belt assembly at a point adjacent the user's shoulder;
   a second comfort clip for attachment to the lap belt strap of an automotive seat belt assembly at a point adjacent the hip of the user;
   at least one of said comfort clips comprising a base together with first and second arms extending upward from said base, said arms spaced sufficiently apart to receive therebetween the corresponding strap, together with a latch mounted on said arms and cooperating with said base so that, in a latched position, the strap is clamped between said latch and said base and, in an unlatched position, aid comfort clip is free to move with respect to the strap, said arms having slots therein extending through said base and upward through said arms to define a pivot pin receptacle, and pivot pins on said latch to be received in said receptacle so that said latch can pivot with respect to said base and said arms; and
   a rod interconnecting said first and second comfort clips to limit the distance between said comfort clips so that said first comfort clip holds the shoulder harness strap over the shoulder of the user, an arcuate slot in said base and a connector body on said rod for engagement in said slot so as to permit limited angular motion between said base and said rod to aid in alignment.

2. The shoulder harness strap adjuster of claim 1 wherein said attachment means for said rod comprises a hook thereon and there is a corresponding recess in said base of said comfort clip, said hook on said rod being positioned within said recess in said base so that when said latch is engaged upon a strap to look a strap, the strap engages on said hook to retain said hook within said base.

3. The shoulder harness strap adjuster of claim 2 wherein said rod is a single body formed with one of said connector bodies integrally formed at each end thereof.

4. The shoulder harness strap adjuster of claim 1 wherein said rod comprises first and second rod bodies, said first and second rod bodies respectively carrying thereon first and second connector bodies with said connector bodies being respectively sized to engage said first and second comfort clips, strap engagement means on each of said rod bodies and a strap interconnecting said strap engagement means so that the distance between said connector bodies can be adjusted to adjust the distance between said first and second comfort clips.

5. A shoulder harness strap adjuster comprising:
   a first comfort clip for attachment to the shoulder harness strap of an automotive seat belt assembly at a point adjacent the user's shoulder;
   a second comfort clip for attachment to the lap belt strap of an automotive seat belt assembly at a point adjacent the hip of the user;
   at least one of said comfort clips comprising a base together with first and second arms extending upward from said base, said arms spaced sufficiently apart to receive therebetween the corresponding strap, together with a latch mounted on said arms and cooperating with said base so that, in a latched position, the strap is clamped between said latch and said base and, in an unlatched position, said comfort clip is free to move with respect to the strap; and
   a rod interconnecting said first and second comfort clips to limit the distance between said comfort clips so that said first comfort clip holds the shoulder harness strap over the shoulder of the user, a hook on said rod and a corresponding recess in said base of said comfort clip, said hook on said rod being positioned within said recess in said base so that, when said latch is engaged upon a strap to lock a strap, the strap engages on said hook to retain said hook within said base.

6. A shoulder strap harness adjuster comprising:
   a first comfort clip for attachment to the shoulder harness strap of an automotive seat belt assembly at a point adjacent the user's shoulder;
   a second comfort clip for attachment to the lap belt strap of an automotive seat belt assembly at a point adjacent the hip of the user; and
   a rod interconnecting said first and second comfort clips to limit the distance between said comfort clips so that said first comfort clip holds the shoulder harness strap over the shoulder of the user;
   at least one of said comfort clips comprising a base together with first and second arms extending upward from said base, said arms being spaced sufficiently apart to receive therebetween the shoulder harness strap, together with a latch mounted on said arms, said latch comprising a latch body mounted between said arms and a sliding latch movably mounted on said latch body, said sliding latch and said latch body having interengaging sloped surfaces so that, when said sliding latch is moved in a fist direction on said latch body, said sliding latch cooperates with said base so that a strap is clamped between said sliding latch and said base.

7. A comfort clip comprising:
   a base having therein an arcuate slot to detachably receive the rod of a shoulder harness strap adjuster;
   first and second spaced arms integrally formed with and extending upward from said base, said fist and second arms each having a slot therein through said base to define a receiver for a pivot pin, said base and said arms being molded of a synthetic polymer composition material;
   a latch, said latch being sized to fit between said first and second arms, said latch having first and second pivot pins extending therefrom so that said pivot pins may be positioned within said pivot pin receivers so that said latch can pivot with respect to said base, said arms being sufficiently resilient so that said latch can be inserted with its pivot pins in said pivot pin receiver and be retained thereby, a stop secured to said latch, said stop being positioned to retain said latch in strap clamping position when strap tension is applied thereto and said stop being positioned to permit unlatching of said latch, said latch together with its pivot pins and stop being integrally molded of synthetic polymer composition material; and an engagement surface on said latch, said engagement surface being positioned to cooperate with said base to clamp a strap therebetween when in clamped position and to free the strap when said latch is in an unclamped position so that said comfort clip may be clamped at a selected position along the length of the strap.

* * * * *